(12) United States Patent
MacCormick et al.

(10) Patent No.: US 7,821,947 B2
(45) Date of Patent: Oct. 26, 2010

(54) AUTOMATIC DISCOVERY OF SERVICE/HOST DEPENDENCIES IN COMPUTER NETWORKS

(75) Inventors: John MacCormick, San Francisco, CA (US); Paul Barham, Cambridge (GB); Moises Goldszmidt, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 506 days.

(21) Appl. No.: 11/739,312

(22) Filed: Apr. 24, 2007

(65) Prior Publication Data

US 2008/0267083 A1    Oct. 30, 2008

(51) Int. Cl.
G01R 31/08    (2006.01)
G06F 15/173    (2006.01)

(52) U.S. Cl. .................. 370/241; 370/252; 709/224
(58) Field of Classification Search ........... 370/252, 370/241, 242; 709/223, 224
See application file for complete search history.

(56) References Cited

U.S. PATENT DOCUMENTS

| | | | |
|---|---|---|---|
| 6,118,936 A | 9/2000 | Lauer et al. | 395/200.53 |
| 6,157,653 A * | 12/2000 | Kline et al. | 370/412 |
| 6,308,282 B1 | 10/2001 | Huang et al. | |
| 6,336,138 B1 | 1/2002 | Caswell et al. | 709/223 |
| 6,775,236 B1 | 8/2004 | Scrandis et al. | 370/241 |
| 6,847,970 B2 | 1/2005 | Keller et al. | 707/100 |
| 6,889,218 B1 | 5/2005 | Nassehi | |
| 7,003,779 B2 | 2/2006 | Riosa et al. | 719/318 |
| 7,082,554 B2 | 7/2006 | Wilson et al. | 714/43 |
| 2002/0032793 A1 | 3/2002 | Malan et al. | |
| 2002/0032871 A1 | 3/2002 | Malan et al. | |
| 2003/0110392 A1 | 6/2003 | Aucsmith et al. | |
| 2003/0110396 A1 | 6/2003 | Lewis et al. | |
| 2004/0153533 A1 | 8/2004 | Lewis | 709/223 |
| 2004/0168100 A1 | 8/2004 | Thottan et al. | |
| 2004/0223461 A1 | 11/2004 | Scrandis et al. | 370/242 |
| 2005/0091532 A1 | 4/2005 | Moghe | |
| 2005/0207413 A1 | 9/2005 | Lerner | |
| 2005/0249214 A1 | 11/2005 | Peng | |

(Continued)

OTHER PUBLICATIONS

Gruschke, B., "Integrated Event Management: Event Correlation Using Dependency Graphs", Presented at *DSOM*, 1998, 1-12, http://www.nm.ifi.lmu.de.

(Continued)

*Primary Examiner*—Nittaya Juntima
(74) *Attorney, Agent, or Firm*—Woodcock Washburn LLP

(57) ABSTRACT

An activity model is generated at a computer. The activity model may be generated by monitoring incoming and outgoing channels for packets for a predetermined window of time. To generate an activity model, an input and an output channel are selected. A probability distribution function describing the observed waiting time between packet arrivals on the selected input channel and the selected output channel is generated by mining the data collected during the selected window of time. A probability distribution function describing the observed waiting time between a randomly chosen instant and receiving a packet on the selected input channel is also generated. The distance between the two generated probability distribution functions is computed. If the computed distance is greater than a predefined confidence level, then the two selected channels are deemed to be related. Otherwise, the selected channels are deemed to be unrelated. The activity model is further generated by comparing each input and output channel pair entering or leaving a particular computer.

20 Claims, 8 Drawing Sheets

U.S. PATENT DOCUMENTS

| | | | |
|---|---|---|---|
| 2006/0031473 A1 | 2/2006 | Wood | 709/224 |
| 2006/0034305 A1 | 2/2006 | Heimerdinger et al. | |
| 2006/0037077 A1 | 2/2006 | Gadde et al. | |
| 2006/0047807 A1 | 3/2006 | Magnaghi et al. | |
| 2006/0075496 A1 | 4/2006 | Carpenter et al. | |
| 2006/0089985 A1 | 4/2006 | Poletto | |
| 2006/0191010 A1 | 8/2006 | Benjamin | |
| 2006/0233313 A1 | 10/2006 | Adams, Jr. et al. | 379/21 |

OTHER PUBLICATIONS

Gruschke, B., "A New Approach for Event Correlation based on Dependency Graphs", http://hpovua.org, 1-8.

Steinder, M. et al., "End-to-End Service Failure Diagnosis Using Belief Networks", http://www.cis.udel.edu, 16 pages.

Kiciman, E., "Using Statistical Monitoring to Detect Failures in Internet Services", A Dissertation Submitted to the Department of Computer Science and the Committee on Graduate Studies of Stanford University in Partial Fulfillment of the Requirements for the Degree of Doctor of Philosophy, Sep. 2005, 168 pages.

Peng, T. et al., "Protection from Distributed Denial of Service Attack using History-Based IP Filtering", http://www.cs.mu.oz.au/~tpeng/mudquard/research/icc2003, 2003, 6 pages.

Zhang, M., "Understanding Internet Routing Anomalies and Building Robust Transport Layer Protocols", A Dissertation Presented to the Faculty of Princeton University in Candidacy for the Degree of Doctor of Philosophy, Sep. 2005, 119 pages.

Jongho Choy and Sung-Bae Cho, Anomaly Detection of Computer Usage Using Artificial Intelligence Techniques, Department of Computer Science, Yonsei University 134 Shinchon-dong, Sudaemoon-ku, Seoul 120-749, Korea, Springer-Verlag Berlin Heidelberg 2001, pp. 31-43, 2001.

Winkler, J.R. and Page, W.J., Intrusion and Anomaly Detection in Trusted Systems, 1990 IEEE, Planning Research Corporation Government Information Systems, R&D 1500 Planning Research Drive, McLean, VA 22102, p. 39-45.

Animesh Patcha, Network Anomaly Detection with incomplete Audit Data, Jul. 6, 2006, p. 1-136.

In the United States Patent and Trademark Office, in re.: U.S. Appl. No. 11/554,980 filed Oct. 31, 2006, Final Office Action dated Jun. 1, 2009, 7 pages.

In the United States Patent and Trademark Office, in re.: U.S. Appl. No. 11/554,980 filed Oct. 31, 2006, Non-Final Office Action dated Dec. 30, 2008, 8 pages.

In the United States Patent and Trademark Office, in re.: U.S. Appl. No. 11/554,980 filed Oct. 31, 2006, Final Office Action dated Jun. 5, 2008, 10 pages.

In the United States Patent and Trademark Office, in re.: U.S. Appl. No. 11/554,980 filed Oct. 31, 2006, Non-Final Office Action dated Jan. 30, 2008, 7 pages.

In the United States Patent and Trademark Office, in re.: U.S. Appl. No. 11/554,980 filed Oct. 31, 2006, Final Office Action dated Aug. 6, 2007, 10 pages.

In the United States Patent and Trademark Office, in re.: U.S. Appl. No. 11/554,980 filed Oct. 31, 2006, Non-Final Office Action dated Apr. 2, 2007, 10 pages.

Batsell, S.G. et al., "Distributed Intrusion Detection and Attack Containment for Organizational Cyber Security", Cyberspace Sciences and Information Intelligence Research website, http://www.ioc.ornl.gov//projects/containment.shtml, last updated Sep. 3, 2009, accessed on Dec. 1, 2009, 7 pages.

Shou-Chuan Lai, "Defending against Internet Worm-like Infestations", Proceedings of the 18th International Conference on Advanced Information Networking and Application (AINA '04), Fukuoka, Japan, Mar. 29-31, 2004, vol. 1, 6 pages.

* cited by examiner

AUTOMATIC DISCOVERY OF SERVICE/HOST DEPENDENCIES IN COMPUTER NETWORKS

CROSS-REFERENCE TO RELATED APPLICATIONS

This application is related to the U.S. patent application Ser. No. 11/554,980 titled "Distributed Detection with Diagnosis". The contents of the application are hereby incorporated in its entirety.

BACKGROUND

Modern computers receive and transmit an increasingly large amount of packets. These packets represent communications with other computers, such as requests for services and data, for example. Because of the large volume of packets sent and received, it is difficult to determine problems and performance issues with the various services on the computer or that are available on the network.

Existing solutions to this problem generally rely on processing some type of alarm or error data to determine the cause of a particular problem. Other solutions repeatedly probe existing services to determine if they are available or working correctly. Processing alarm data fails to solve the problem because it may require a substantial infrastructure to be added to the system or network and may require dedicated hosts or applications to collect, aggregate and analyze the data. This alarm information is typically routed or collected at a central location, and may require data from various interdependent services. Often, the data is not particularly detailed, and it can be therefore difficult to determine what were the underlying causes of the alarms.

The repeated probing of services is also flawed in that there is a delay introduced before a problem can be detected. For example, if a system is set to probe each service every five minutes, then a problem may possibly go undetected for up to five minutes. Probing may also fail to detect intermittent errors, where a service is only working some of the time, but just happens to work when probed.

Furthermore, the perception of the behavior and performance of services may change depending on the viewpoint. For example, mailboxes may work for email users in Philadelphia, but may not work correctly for users in Europe. This problem may be a result of an error with the active directory service in Europe, and have nothing to do with the mailboxes themselves. However, conventional methods of error detection would initially attribute the error to the mail server and not the active directory service running in Europe. This added delay could result in increased expenses or losses, for example.

SUMMARY

An activity model is generated at a computer. The activity model may be generated by monitoring incoming and outgoing channels for packets for a predetermined window of time. To generate an activity model, an input and an output channel are selected. A probability distribution function describing the observed waiting time between packet arrivals on the selected input channel and the selected output channel is generated by mining the data collected during the selected window of time. A probability distribution function describing the observed waiting time between a randomly chosen instant and receiving a packet on the selected input channel is also generated. The distance between the two generated probability distribution functions is computed. If the computed distance is greater than a predefined confidence level, then the two selected channels are deemed to be related. Otherwise, the selected channels are deemed to be unrelated. The activity model is further generated by comparing each input and output channel pair entering or leaving the particular computer.

DETAILED DESCRIPTION

Figure 1:
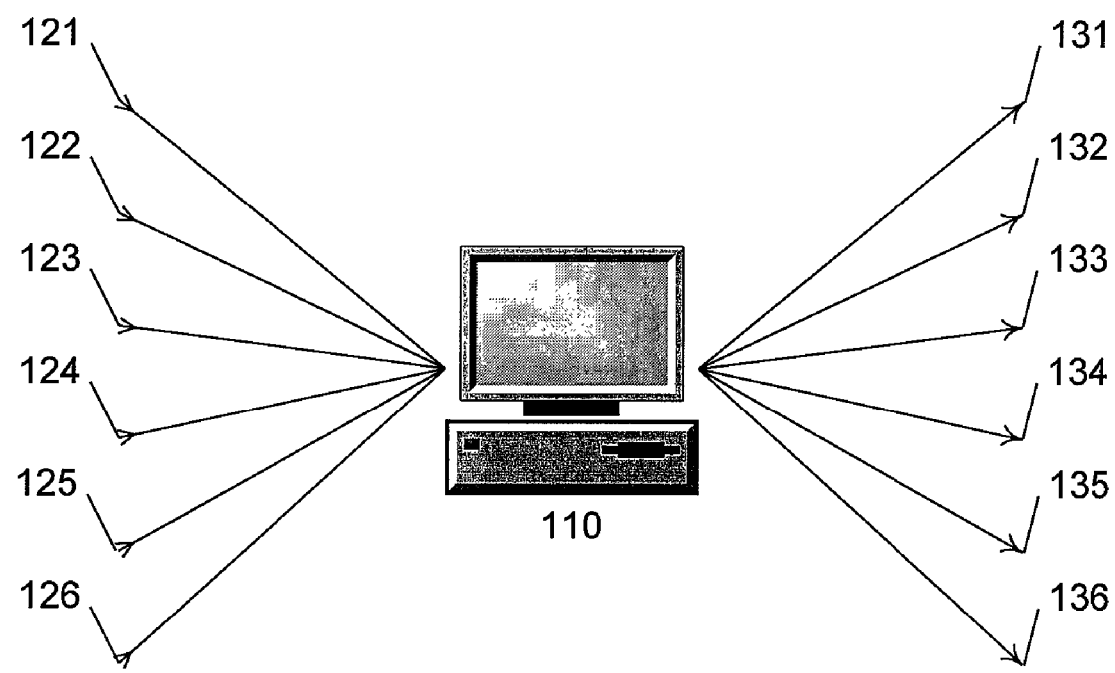
FIG. 1 is an illustration of a computer system including input and output channels.

FIG. 1 is an illustration of a computer system including input and output channels. As shown, the computer 110 includes a plurality of input and output channels. The input channels are labeled 121-126, and the output channels are labeled 131-136. Those skilled in the art will appreciate that the particular number of input and output channels shown is arbitrary, and for illustrative purposes only. There is no limit to the number of input and output channels that the system may support.

Input and output channels may represent connections to another computer on a network, or a connection to a particular service, for example. Services may include networked applications such as email, web, file browsing, and management applications, together with underlying protocols such as SMTP, RPC, HTTP, MSProxy, SMB, Netbios, Active Directory, DHCP, NTP, for example Packets or messages are desirably received through input channels, and packets or messages are desirably sent through the output channels. These packets may contain information such as source or destination address, a name of a particular service associated with that packet, and the actual data payload containing information for the particular service to process or utilize.

An activity model may be generated for the computer 110 by keeping track of the packets that that are sent and received on the various input and output channels. This activity model may then be used as a reference to describe the normal behavior of the host computer 110. For example, after some period of observation, it may be known that typically, when a packet is received at input channel 121, two packets are sent from output channel 134. Later, this information can be used to identify a possible problem in computer 110. For example, if a packet received on input channel 121 does not result in two packets on output channel 134 as expected there might be a problem in the system. The activity model, and its construction, is described further with respect to FIGS. 2 and 3.

Figure 2:
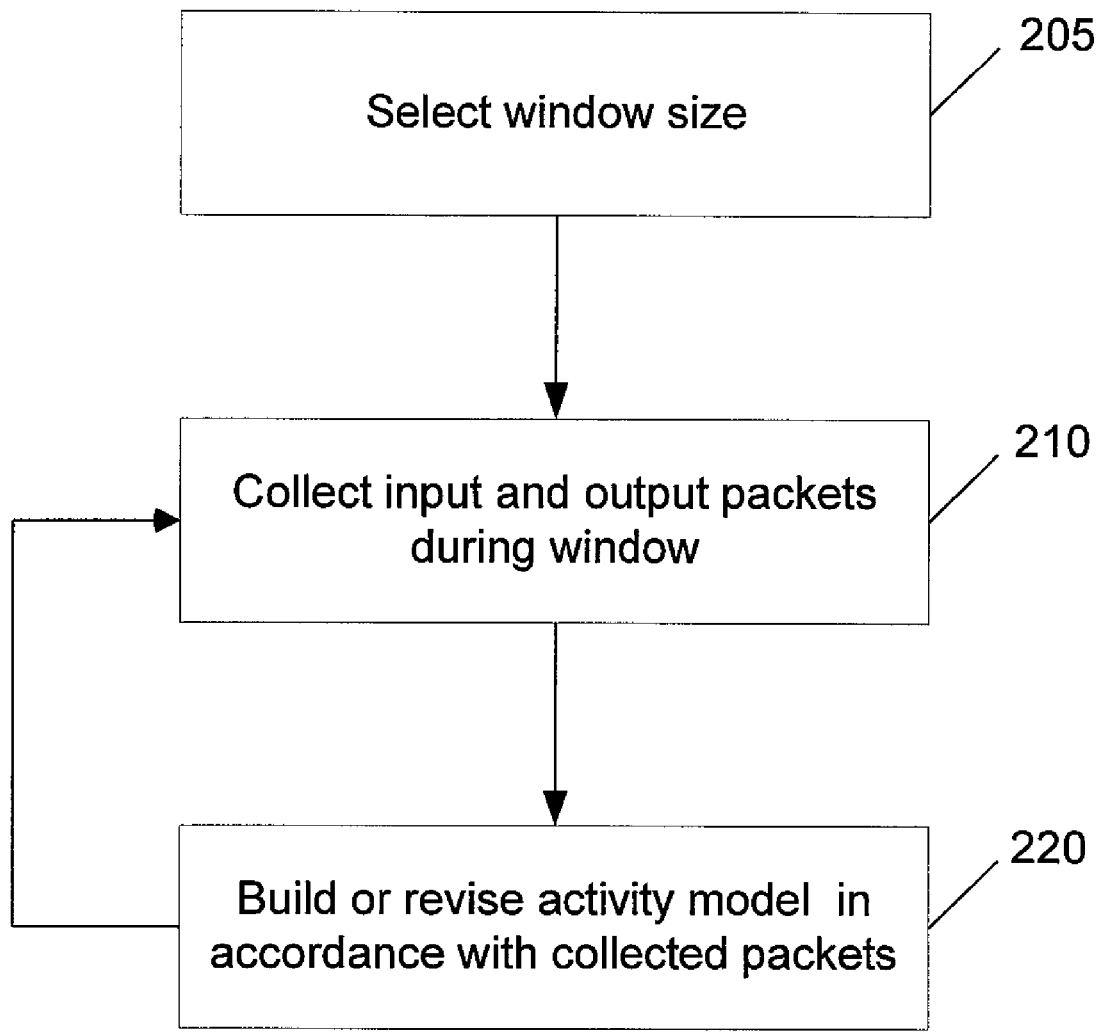
FIG. 2 is an illustration of an exemplary method for creating an activity model.

FIG. 2 is an illustration of an exemplary method for creating an activity model. At 205, a window is desirably chosen. The window is the length of time that packets will be collected or observed on the various input and output channels into the computer. The window may also be defined in terms of the number of packets collected or observed. The information collected during this window will be used to construct the activity model. The length of time, or amount of packets, selected for the window is a trade off between the accuracy of the model and the resources needed to create the model. A larger window will yield a more accurate model, but at the expense of the increased processing time and other resources required to manage the larger amount of data. Any method known in the art for determining an optimal window size may be used.

At 210, the system may begin to collect packets according to the specified window size. In one embodiment, only the origin and destination address (i.e., the input and output channels) of the particular packet is recorded. However, additional data regarding the packet may also be collected such as the payload data and any associated application or service. This additional data can be used to create a more detailed activity model that can predict system behavior using the associated payload data as well as the packet origin and destination information. However, the greater the amount of information collected, the greater the system resources needed and more complicated the resulting activity model will become.

At 220, the system may begin to construct, or modify, the activity model. The activity model may be constructed using a variety of statistical methods and machine learning techniques. One particular method is described in more detail with respect to FIG. 3, for example. However, those skilled in the art will appreciate that a wide variety of techniques may be used.

Because the activity model is dynamic, and may change over time, the model is desirably continuously updated. The activity model is desirably updated automatically, in a way that is transparent to a user of the particular host computer. The activity model may be updated at the end of every window of data collection, or at whatever frequency a user of administrator may desire.

Figure 3:
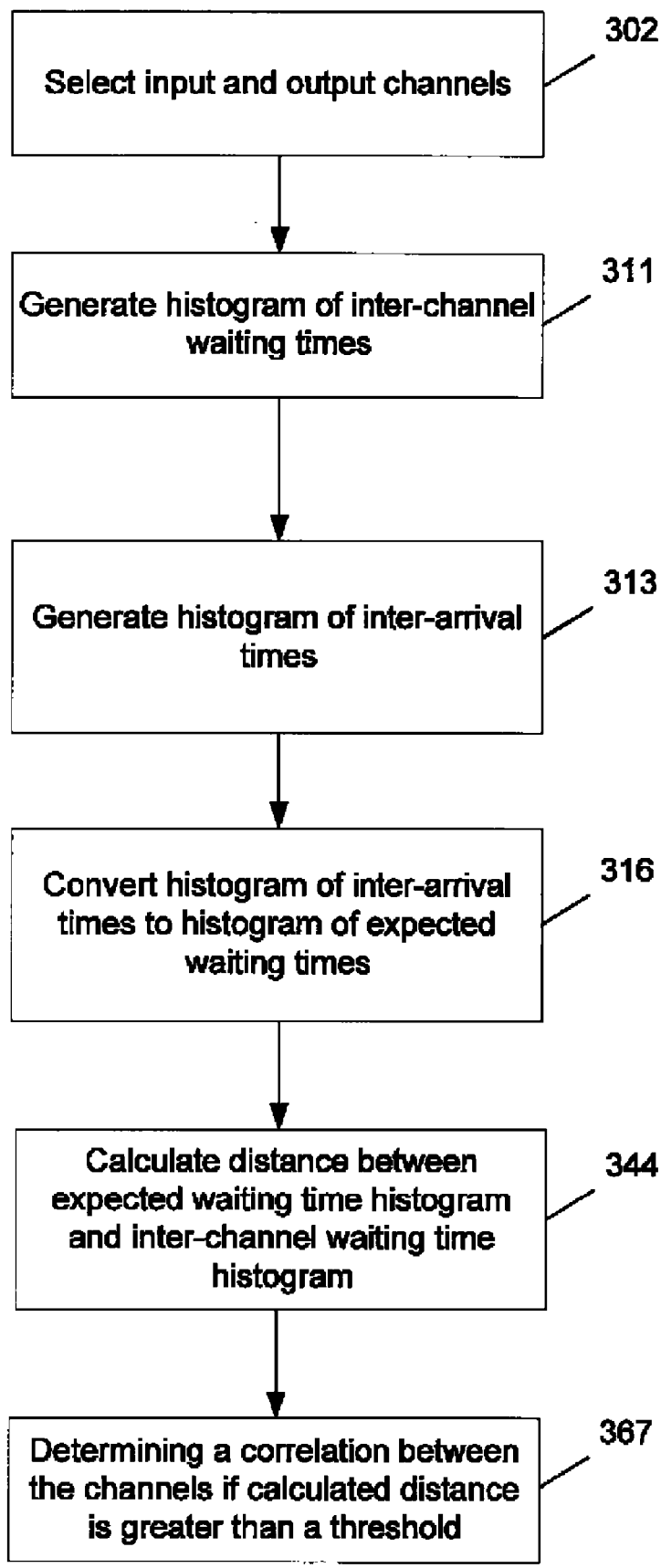
FIG. 3 is an illustration of an exemplary method for correlating input and output channels.

FIG. 3 is an illustration of an exemplary statistical method for creating an activity model. A correlation algorithm may be used to determine statistical relationships between observed input and output channels. For example, consider a hypothetical channel C on a host computer. The channel C may be modeled as a stochastic process that generates packet arrival or departure events at random times according to a selected probability law.

Thus, observing C for some selected window of time results in some set of time stamps (i.e., $c_1, c_2, c_3, \ldots, c_n$) corresponding to observed packet arrival and departure events. The difference $x = c_{i+1} - c_i$ between any two time stamps (i.e., packets) may be called the inter-arrival time. A probability distribution function for C's observed inter-arrival times may be described by the function $f_{T_C}(x)$, for example.

Given an input channel A and an output channel B on the same host computer, let $b_i$ be a randomly selected event from B and let $a_j$ be the most recent event in A that directly proceeds $b_i$. The difference $x = b_i - a_j$ may be defined as the inter-channel waiting time. The probability distribution function for the inter-channel waiting time may be denoted $f_{W_{a \to b}}(x)$.

The channel B may be uncorrelated with A if the characteristics of the inter-channel waiting time are indistinguishable under some statistical test from the characteristics of the predecessor waiting time of A. In other words, if the if the statistical distribution of the time elapsed between each output packet and its closest preceding input packet is indistinguishable from a distribution of time elapsed between a random instant and the closest preceding input packet then the channels are uncorrelated.

In statistical terms, the correlation between A and B may be tested by disproving following null hypothesis on the predecessor and inter-channel waiting time probability distribution functions:

$$H_0: f_{W_A} = f_{W_{A \to B}}$$

If $H_0$, the null hypotheses, can be rejected with high confidence, that is that the probability distribution function for the predecessor waiting time is not equal to the probability distribution function of the inter-channel waiting time, then there is good evidence that the output channel B is dependent on the input channel A. The embodiment described below is just one method for testing the null hypothesis.

At 302, an input and an output channel are selected to be analyzed. While only one input and output channel pair is discussed herein, for the purposes of constructing the activity model it is contemplated that some of all of the possible input and output channel pair combinations on a particular host computer will be tested. Any system, method or technique known in the art for selecting input channels may be used.

At 311, a histogram describing the inter-channel waiting time between packets received on the selected input channel and packets sent on the selected output channel is generated. As described above, the activity model is constructed by observing all input and output packets sent and received on the various channels into the host computer during a predetermined window of time. Thus, the observed waiting time histogram may be constructed by mining the collected data on the selected input and output channels and determining the time difference between a packet received in the input channel and the next packet send on the output channel. Any system, method, or technique known in the art for generating a histogram can be used, as well as any system, method, or technique known in the art for fitting a parametric probabilistic model and generating a probability density function.

At 313, a histogram describing the inter-arrival times of packets on the selected input channel is constructed. The histogram describing the inter-arrival time between packets on the selected input channel may be constructed by mining the collected packet data for the selected input channel and recording the arrival time of packets received in the window. The time difference between consecutive packets is the inter-arrival time.

At 316, the histogram of the inter-arrival times may be converted into a histogram of the expected waiting time for packets on the selected input channel. The histogram may be converted according to the following formula:

$$f_{W_A}(x) \propto \int_{x'=x}^{\infty} f_{Y_A}(x') dx'.$$

At 344, the distance between the histogram of the inter-channel waiting time and the histogram of the expected waiting time for packets on the selected input channel is calculated for the selected input and output channels. As described above, the input and output channels are related, if there is a statistical difference between $f_{W_a}$ (i.e., the expected waiting time for the input channel histogram calculated at 316) and $f_{W_{a \to b}}$ (i.e., the input and output channel inter-channel waiting time histogram calculated at 311). There are many known methods to calculate the differences between two probability distribution functions. In one embodiment, the Kolmogorov-Smirnov (K-S) test is used. The K-S test first computes the cumulative density functions $F_{W_a}$, $F_{W_{a \to b}}$, from $f_{W_a}$, $f_{W_{a \to b}}$, then defines the K-S statistic:

$$K = \max_x |F_{W_A}(x) - F_{W_A \to B}(x)|.$$

A closed-form formula may then used to transform K into a level of significance P. Any method for transforming K into a level of significance P known in the art may be used.

At 367, the calculated value P is compared with a predetermined level of confidence to determine if the selected input and output channels are correlated. In one embodiment, the input and out put channels are correlated if 1−P is greater than 99%. However, the predetermined level of confidence selected may depend on the particular service being tested as well as the number of samples available.

Figure 4:
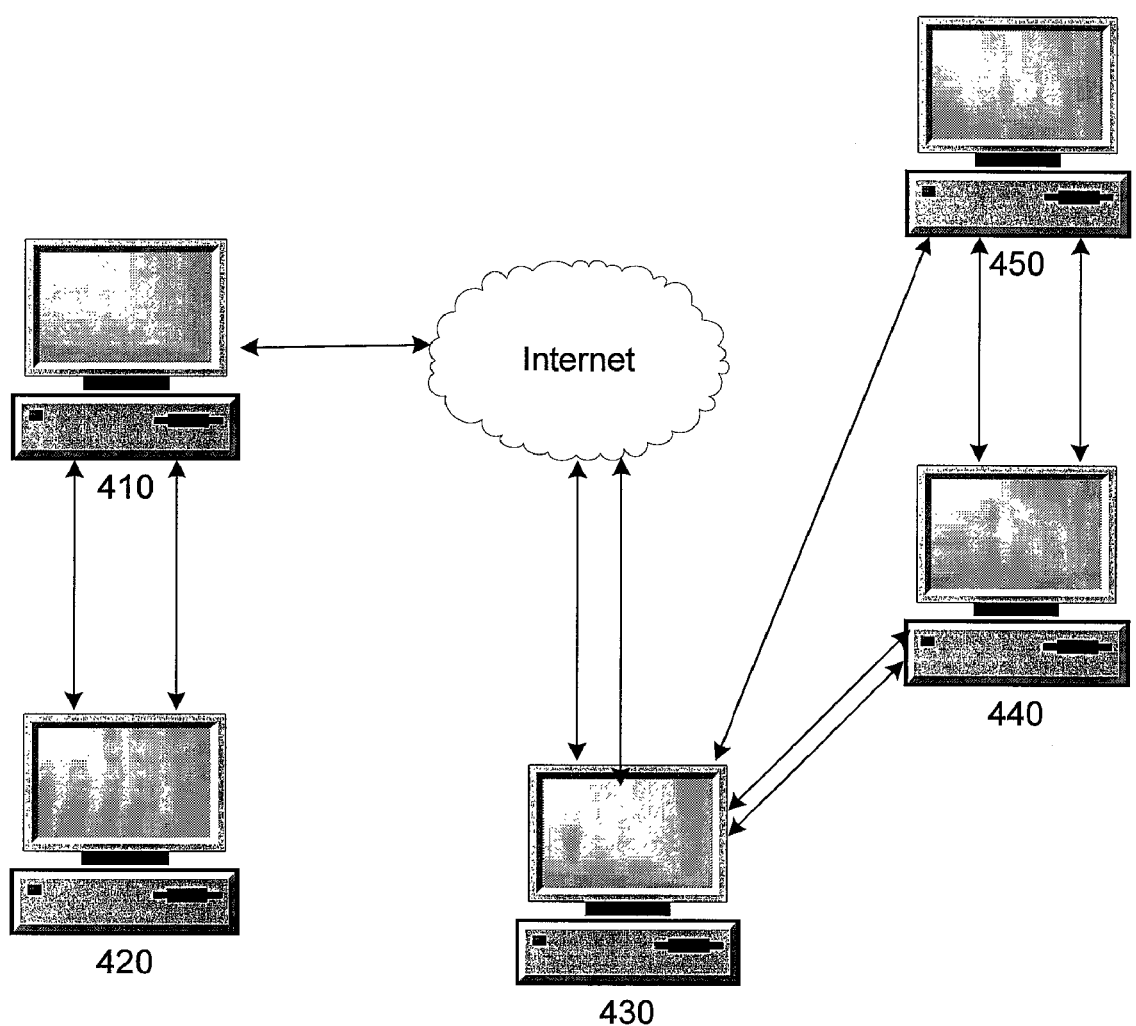
FIG. 4 is an illustration of an exemplary network of hosts including activity models.

FIG. 4 is an illustration of an exemplary network of hosts including activity models. As illustrated, there are several host computers shown. These include hosts 410, 420, 430, 440, and 450. Each of these hosts may be connected to one another through a variety of channels, illustrated by the arrows connecting the hosts. Further, each of these hosts may have an activity model along with some type of activity model client that maintains the activity model, as well as responds to queries made to the activity model. Note that while the illustrated network comprises only five hosts, it is for illustrative purposes only, and not meant to limit the invention to networks of five hosts. There is no limit to the number of hosts that may be supported.

The system illustrated in FIG. 4 desirably allows hosts to not only query their own activity models, but also the activity models of the other hosts on the network. For example, a user at host 430 may learn that a some users are having difficulties with their email. Accordingly, the user may query the activity model of the host 430 using an API such as one discussed above. However, rather than simply taking a window of packets and comparing them against the activity model to determine if there is a statistically significant change in the behavior of the system that may indicate a problem, the revised API may take the further step of recursively querying the activity models of the hosts on the network that the host 430 receives packets from, or has channels with. These hosts may then recursively query the activity models of the hosts that they receive packets from, and so forth.

The results from each of the various hosts are then returned to the host 430 who is then able to see which, if any, of the various hosts on the network may be the cause of the email difficulty. Once the host 430 determines which host is not behaving correctly according to its activity model, the host 430 may use its own activity model to isolate the various channels and packets that connect it to that particular hosts and further query its activity model using a window comprising those packets to further determine the service or cause of the failure.

In another embodiment, when the host 430 queries its activity model, the activity model may only recursively query the activity models of hosts who have a high connectivity to other hosts on the network. The activity model can be used to determine, given a particular input, to which computers the host computer is likely to send output packets. In a similar way, it may be determined which hosts the particular host 430 is most connected to or most dependent on. Therefore, when determining the source of an error by recursively querying active directories, the host 430 may conserve resources by first only querying hosts who it is highly connected to, and that are therefore the most likely candidates for the source of the error.

Figure 5:
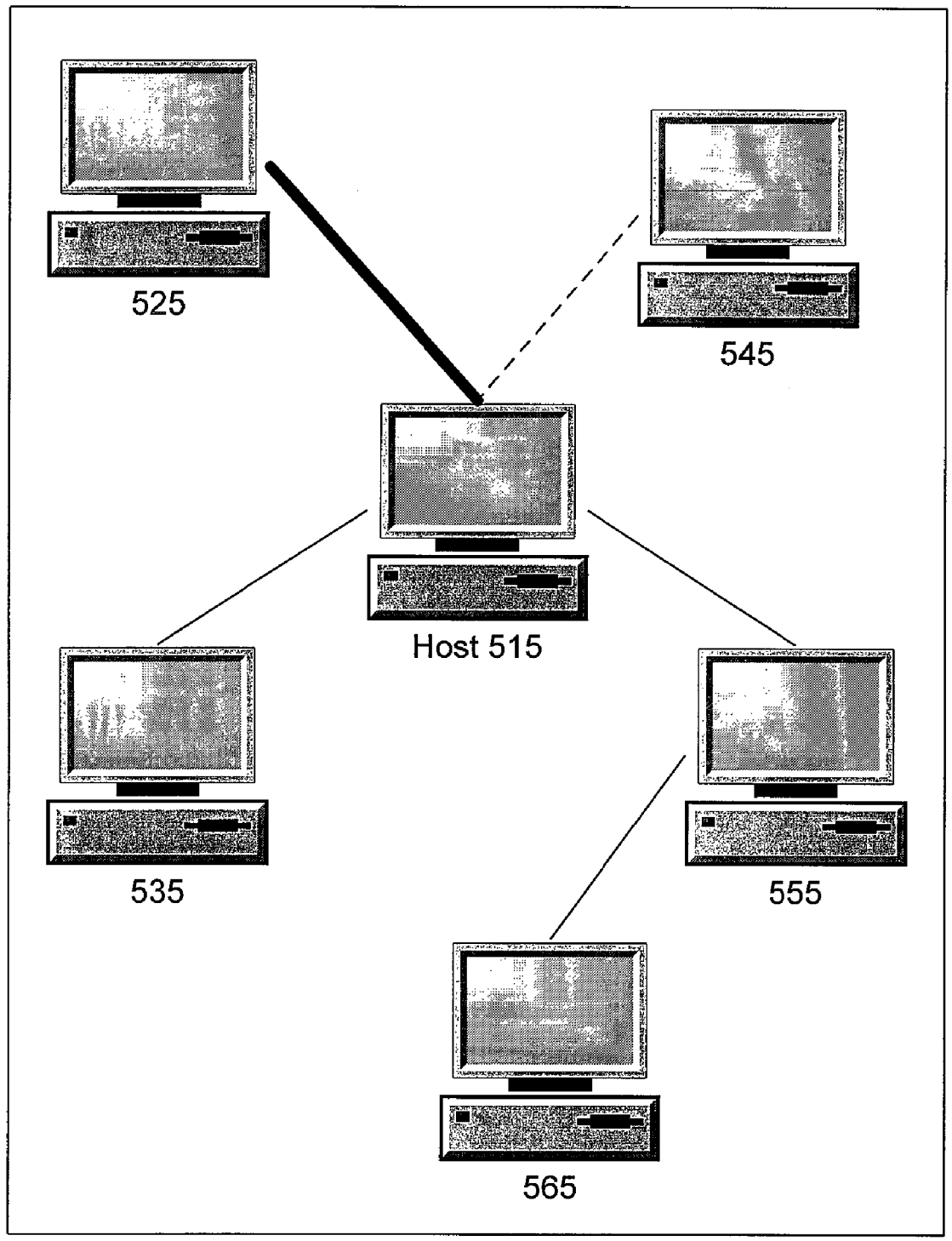
FIG. 5 is an illustration of an exemplary screenshot of a connection view system.

FIG. 5 is an illustration of an exemplary screenshot of a connection view system. The connection view system desirably provides a user or administrator of a host computer with a graphical view of the computers, and or service, that the particular host computer may depend on. As shown, the host computer 515 depends, or receives packets from computers 525, 545, 535, and 555. In addition, the host computer 515 indirectly depends on computer 565 through its dependency on computer 555.

As described above, the particular computers shown in the dependency graph are desirably determined using the activity model associated with host computer 515. The activity model of the host computer 515 can determine which computers send packets to the host computer, and which computers receive packets from the host computer. Accordingly, these computers may be shown in the connection view. In one embodiment, all computers that are connected to the host computer 515 are shown. In another embodiment, only computers that meet some connectivity threshold are illustrated. This threshold may be determined by a user or administrator, for example. Any system, method, or technique known in the art may be used.

As shown in FIG. 5, the relative importance or strength of the connection between the computers and the host computer 515 is illustrated by the thickness of the line connecting the computers. For example, the thick line between computer 525 and host computer 515 denotes a strong or high dependency. Similarly, the hashed line between computer 545 and host computer 515 denotes a weaker or low dependency. In addition, colors may be used to illustrate the dependency. Those skilled in the art will recognize that the relative dependency of the computers may be illustrated by a variety of well known methods. Any technique known in the art may be used.

The connection view system may be further used to illustrate to a user the health of the host computer and the health of those computers connected to it. For example, the activity model of the host computer may be queried, along with the activity models of the various computers connected to the host computer. If the activity models report that their respective systems are behaving normally, then the corresponding icons for those systems may be displayed normally, or with a shade of green to indicate everything is working correctly. Similarly, if an activity model shows that a particular system is behaving strangely, then the system may display the icon associated with that computer in some way to illustrate the problem, such as a shade of red, for example.

Another aspect of the connection view system may be to display to the user which services or resources are associated with the computers displayed in the connection view. As described above, the activity model may be allowed to inspect the received and sent packets to determine which service or services they may be associated with. Also, separate service specific activity models may be kept to help determine if the particular service is behaving correctly. Using these features, the activity model may be referenced to determine which services are provided from, or associated with, each displayed host. The service or services may be displayed next to the associated computer. In addition, the activity models of the associated computers may be additionally queried to determine if these services appear to be working correctly. These services may they be displayed in such a way as to indicate their health, e.g., red or green.

As described above, the connection view may initially only show the computers that have connections to, or send packets to, the host computer 515. However, an alternative embodiment may include the feature of allowing a user to select and expand a particular host computer to view the computers connected to the selected host. For example, as illustrated in FIG. 5, computer 565 is connected to computer 555, which is connected to the host computer 515. Initially computer 565 may not be displayed to a user of the host computer 515 because it is not directly connected to it. However, the user may be able to expand the view by clicking, or otherwise selecting computer 555. After expanding the view the user may be presented with one or more additional computers connected to computer 555, for example. The computers that connect to computer 555 may be determined by querying the activity model of computer 555.

As will be apparent to those skilled in the art, the activity model, particularly the activity model capable of querying other activity models in a networked environment, may be useful for a variety of specialized applications. For example, one such application may be anomaly detection. A particular system may continuously query its own activity model in order to detect anomalies. If the detected behavior is not predicted by the activity model, or differs from the activity model in a statistically significant way, then it may be useful to alert a user that an anomaly has been detected.

Similarly, in a networked environment, systems on the network that detect anomalies may alert other systems on the network to query their activity models to see if they detect a similar anomaly, or to warn them of possible anomalies. This may be particularly useful for the detection of flash crowds, or a denial of service attack for example.

The activity model may be particularly useful for the differentiation between flash crowds and denial-of-service attacks. A flash crowd is when an unusually large number of users attempt to view a particular web site at the same time. This is usually the result of the posting of an article referencing the web site on a popular internet site that serves to direct a large number of users to the particular web site. In contrast, a denial-of-service attack is a concentrated malicious attack that attempts to crash, or otherwise render inoperable, a web server by repeatedly resending requests to it.

Often web pages are served not by a single web server, but by several web severs, each with a separate IP address. When a typical user makes a request for a web page, the actual server that serves the request is not known to the user, but may be selected according to some load balancing algorithm, for example. In contrast, when a malicious web user or users attempt a denial of service attack, they generally specify the IP address of the server they are attacking. This observation can be used by the activity models to differentiate between the two types of attacks. Thus, when a server under heavy load queries its activity model, and determines that the amount of traffic it is receiving is unusually high it desirably first recursively queries the activity models of the other servers connected to it. If the activity models of the other servers generally show that they are also experiencing unusually high traffic, then it may be assumed that a flash crowd is taking place. However, if few servers are also experiencing the high traffic, then it may be assumed that a denial-of-service is taking place and appropriate action may be initiated.

Figure 6:
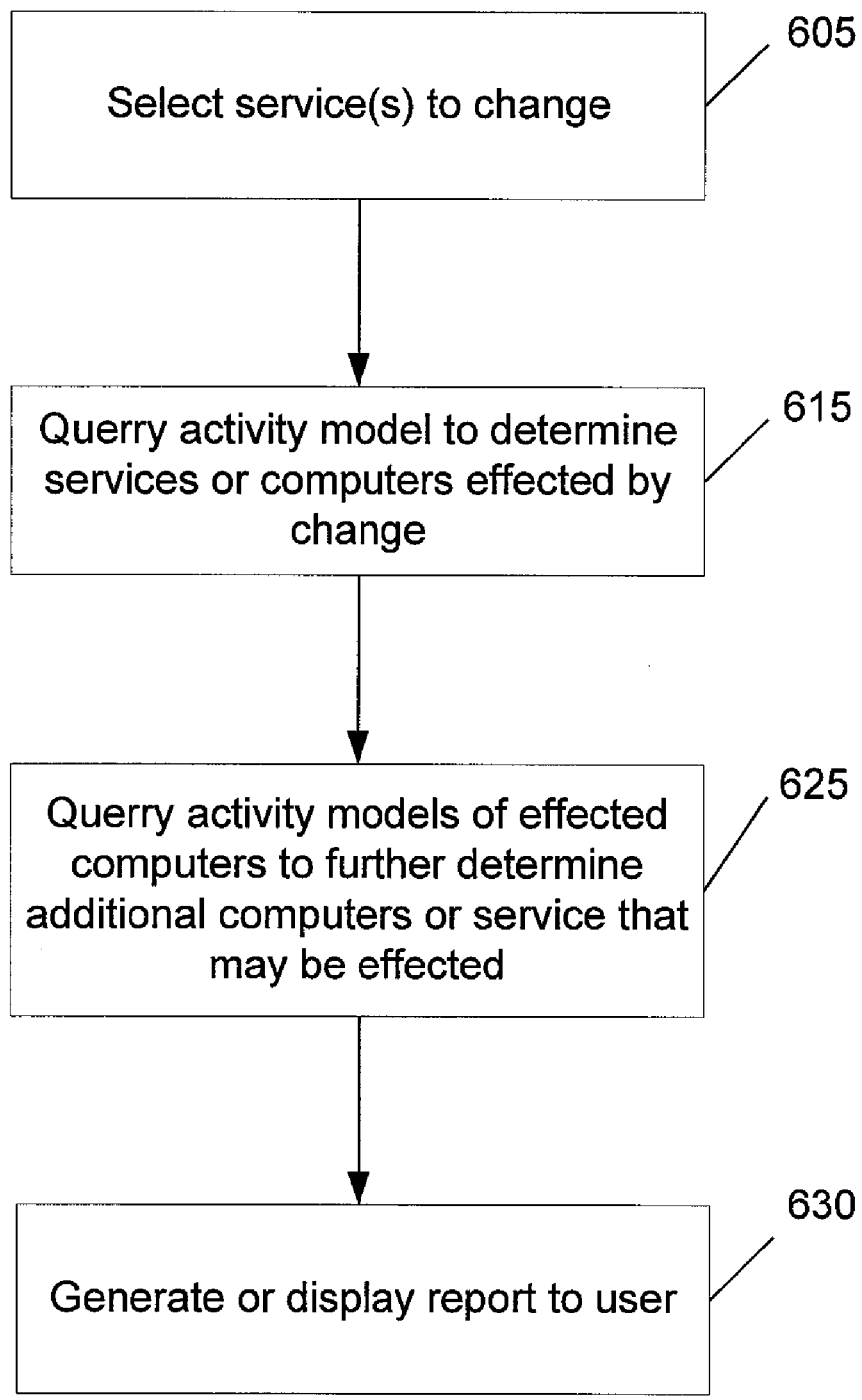
FIGS. 6 and 7 illustrate applications of the activity model.

FIG. 6 illustrates yet another application of the activity model. In this example, the activity model may be used to perform a service dependency performance analysis. At 605, a user or administrator may desire to make a particular change to a service, for example. However, rather than actually make the change and observe the effects, the user may wish to use the activity models to generally predict the impact of the service change to the overall system or network.

At 615, the particular host or host(s) where the initial service change has been determined to take place, may have their activity models examined or queried to determine which systems on the network will be affected by the change in the service. This may be determined by using the activity model to identify which systems receive output packets from the particular host or host(s) that are deemed to be part of the changed service, for example.

At 625, the set of computers on the network that depend or will be most affected by the change in the service have their activity models queried to determine which services or resources on those computers will be affected by the change in the service. This may be accomplished by using the incoming packets that were found to be associated with the changed service to determine the outgoing packets that are statistically associated with the incoming packets according to the activity model. These services may be presented to the user in a report at 630, or if desired, the computers associated with the outgoing packets may in turn have there activity models queried and so forth. In this way the number of computers potentially affected by the change in service can be determined to whatever degree the user may desire.

At 630, the user may be presented with a report indicating the effect of the proposed service change to the system. This report may be similar to that illustrated and described with respect to FIG. 5, for example, and show the computers most effected by the proposed change in service. In addition, the services that may be affected as determined by the activity models may also be displayed along with an indicator of the probability that they will be affected, for example. However, those skilled in the art will appreciate that the report data may be displayed to the user using a variety of techniques known in the art for the presentation of data.

Figure 7:
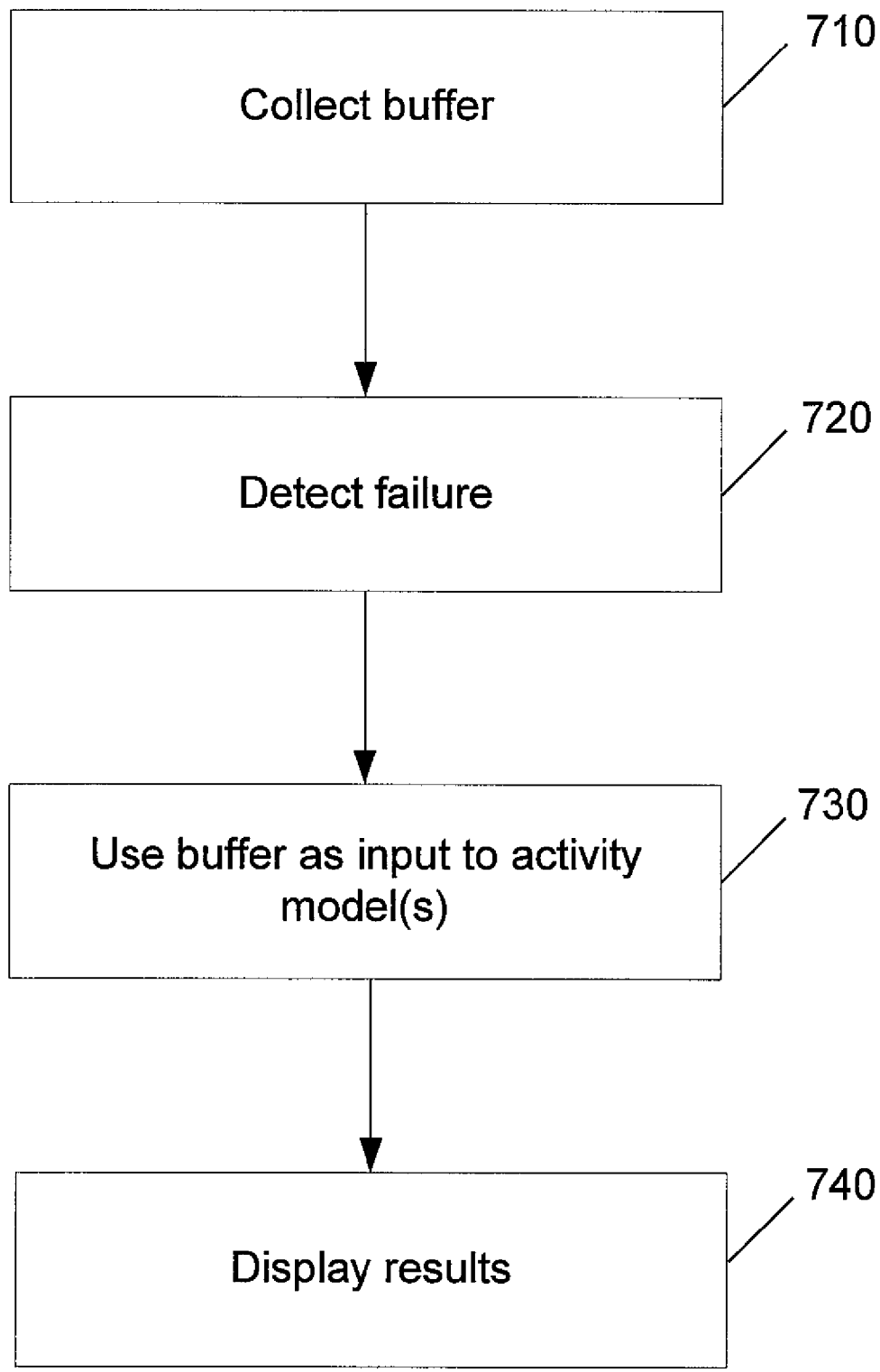

FIG. 7 illustrates yet another application of the activity model. Here, the network of activity models is used to determine the cause of a detected network outage or failure. At 710, the computers comprising the computer network may begin maintaining a buffer of the last N packets sent to, or received from, other computers on the network. These packets may then be used later to reconstruct the network activity prior to a detected failure. The actual number of packets chosen to buffer is a tradeoff between the memory required to store the packets, and the desire to have as much information available to reconstruct the network activity prior to the failure.

At 720, a network failure or outage may be detected. This failure may be a service failure, or the failure of one or more of the computers on the network. The failure may be detected by a user or administrator, one or more of the activity models available on the network, or by the computers themselves.

At 730, after detecting the network failure, one or more of the computers on the network may use the buffered packets to query their activity model to determine the source of the failure. The buffered packets desirably serve as a snapshot of the network activity just prior to the detected failure. Accordingly, the computer where the failure was detected may query its activity model with the recorded packet activity. In addition, the other computers on the network may similarly query their activity models using their collected packets. Depending on the results of the queries, service specific activity models may also be queried in order to further determine the source of the failure.

At 740, the user may be presented with a report indicating the possible sources of the network failure as detected by the activity models. This report may be similar to that illustrated and described with respect to FIG. 5, for example. However, those skilled in the art will appreciate that the report data may be displayed to the user using a variety of techniques known in the art for the presentation of data.

Exemplary Computing Arrangement

Figure 8:
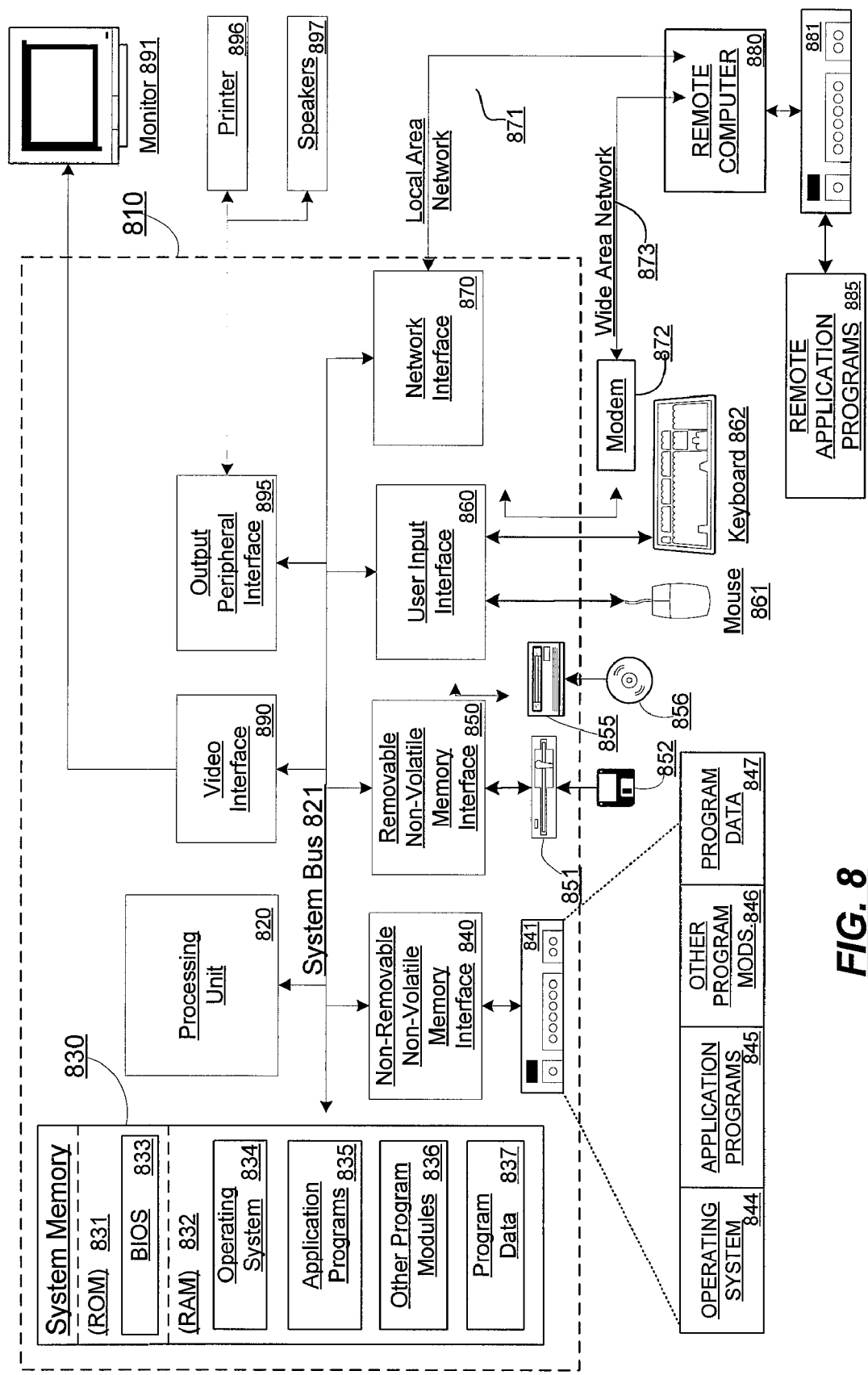
FIG. 8 is a block diagram of an example computing environment in which example embodiments and aspects may be implemented.

FIG. 8 shows an exemplary computing environment in which example embodiments and aspects may be implemented. The computing system environment 800 is only one example of a suitable computing environment and is not intended to suggest any limitation as to the scope of use or functionality. Neither should the computing environment 800 be interpreted as having any dependency or requirement relating to any one or combination of components illustrated in the exemplary operating environment 800.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system includes a general purpose computing device in the form of a computer 810. Components of computer 810 may include, but are not limited to, a processing unit 820, a system memory 830, and a system bus 821 that couples various system components including the system memory to the processing unit 820. The processing unit 820 may represent multiple logical processing units such as those supported on a multi-threaded processor. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 821 may also be implemented as a point-to-point connection, switching fabric, or the like, among the communicating devices.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 840 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 20 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 6. The logical connections depicted in FIG. 6 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 6 illustrates remote application programs 885 as residing on memory device 881. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for detecting correlation between an input channel and an output channel, comprising:
    generating packet data by observing packets sent and received through the input and output channels for a window of time;
    generating, by a processor, a model of inter-arrival time of packets received on the input channel and packets sent on the output channel;
    generating, by the processor, a model of predecessor waiting time for packets received on the input channel;
    determining a difference between the model of inter-arrival time and the model of predecessor waiting time; and
    determining that the input and output channels are correlated if the difference is greater than a threshold.

2. The method of claim 1, wherein the model of inter-arrival time is generated by mining the packet data for arrival times of packets received on the input channel, and for each packet received, identifying an elapsed time between receipt of the packet and a subsequent packet sent on the output channel.

3. The method of claim 1, wherein the model of inter-arrival time comprises a histogram.

4. The method of claim 1, wherein the model of predecessor waiting time comprises a histogram.

5. The method of claim 1, wherein the threshold is 99%.

6. The method of claim 1, wherein the difference between the model of inter-arrival time and the model of predecessor waiting time is calculated using the Kolmogorov-Smirnov test.

7. The method of claim 1, wherein generating, by the processor, a model of predecessor waiting time for packets received on the input channel comprises generating a model of inter-arrival times of packets received on the input channel, and converting the model of inter-arrival times to the model of predecessor waiting time.

8. A tangible computer-readable storage medium, excluding transmission media and carrier waves, with computer-executable instructions stored thereon that when executed by a processor perform a method comprising:
    generating packet data by observing packets sent and received through an input channel and an output channel for a window of time;
    generating a model of inter-arrival time of packets received on the input channel and packets sent on the output channel;
    generating a model of predecessor waiting time for packets received on the input channel;
    determining a difference between the model of inter-arrival time and the model of predecessor waiting time; and
    determining that the input and output channels are correlated if the difference is greater than a threshold.

9. The tangible computer-readable storage medium, excluding transmission media and carrier waves, of claim 8, wherein the model of inter-arrival time is generated by mining the packet data for arrival times of packets received on the input channel, and for each packet received, identifying an elapsed time between receipt of the packet and a subsequent packet sent on the output channel.

10. The tangible computer-readable storage medium, excluding transmission media and carrier waves, of claim 8, wherein the model of inter-arrival time comprises a histogram.

11. The tangible computer-readable storage medium, excluding transmission media and carrier waves, of claim 8, wherein the model of predecessor waiting time comprises a histogram.

12. The tangible computer-readable storage medium, excluding transmission media and carrier waves, of claim 8, wherein the threshold is 99%.

13. The tangible computer-readable storage medium, excluding transmission media and carrier waves, of claim 8, wherein the difference between the model of inter-arrival time and the model of predecessor waiting time is calculated using the Kolmogorov-Smirnov test.

14. The tangible computer-readable storage medium, excluding transmission media and carrier waves, of claim 8, wherein generating a model of predecessor waiting time for packets received on the input channel comprises generating a model of inter-arrival times of packets received on the input channel, and converting the model of inter-arrival times to the model of predecessor waiting time.

15. A computer system comprising a processor and at least one input and one output channels, configured to:
    generate packet data by observing packets sent and received through the input and the output channels for a window of time;
    generate a model of inter-arrival time of packets received on the input channel and packets sent on the output channel;

generate a model of predecessor waiting time for packets received on the input channel;

determine a difference between the model of inter-arrival time and the model of predecessor waiting time; and determine that the input and output channels are correlated if the difference is greater than a threshold.

16. The computer system of claim 15, wherein the model of inter-arrival time is generated by mining the packet data for arrival times of packets received on the input channel, and for each packet received, identifying an elapsed time between receipt of the packet and a subsequent packet sent on the output channel.

17. The computer system of claim 15, wherein the model of inter-arrival time comprises a histogram.

18. The computer system of claim 15, wherein the threshold is 99%.

19. The computer system of claim 15, wherein the difference between the model of inter-arrival time and the model of predecessor waiting time is calculated using the Kolmogorov-Smirnov test.

20. The computer system of claim 15, wherein generating a model of predecessor waiting time for packets received on the input channel comprises generating a model of inter-arrival times of packets received on the input channel, and converting the model of inter-arrival times to the model of predecessor waiting time.

* * * * *